United States Patent [19]

Yamazaki et al.

[11] Patent Number: 4,524,193

[45] Date of Patent: Jun. 18, 1985

[54] MODACRYLIC SYNTHETIC FIBER HAVING AN EXCELLENT DEVITRIFICATION PREVENTING PROPERTY AND A PROCESS FOR PREPARING THE SAME

[75] Inventors: Kaoru Yamazaki, Akashi; Shunichiro Kurioka, Kobe; Mitsuya Sakata, Akashi; Takahiro Ogawa, Takasago, all of Japan

[73] Assignee: Kanegafuchi Kagaku Kogyo Kabushiki Kaisha, Osaka, Japan

[21] Appl. No.: 420,882

[22] Filed: Sep. 21, 1982

Related U.S. Application Data

[63] Continuation of Ser. No. 264,618, May 18, 1981, abandoned.

[30] Foreign Application Priority Data

May 28, 1980 [JP] Japan .................................. 55-71655
May 28, 1980 [JP] Japan .................................. 55-71656

[51] Int. Cl.$^3$ .................................. C08F 2/26; C08F 2/06
[52] U.S. Cl. .................................. 526/79; 526/80; 526/87; 526/287; 264/178 F
[58] Field of Search .................. 526/287, 225, 222, 229, 526/80, 87, 79

[56] References Cited

U.S. PATENT DOCUMENTS 4,163,089 7/1979 Palethorpe .......................... 526/80

FOREIGN PATENT DOCUMENTS 138668 11/1979 Fed. Rep. of Germany ...... 526/287
954096 4/1964 United Kingdom ................ 526/287

*Primary Examiner*—Christopher A. Henderson
*Attorney, Agent, or Firm*—Armstrong, Nikaido, Marmelstein & Kubovcik

[57] ABSTRACT

A modacrylic fiber comprising a copolymer containing acrylonitrile, at least one of vinyl chloride and vinylidene chloride, and a sulfo group-containing vinyl monomer having a relative reactivity of at least 1 to acrylonitrile, in a specific ratio. The copolymer is prepared by polymerizing the monomers, while adding the sulfo group-containing vinyl monomer to the polymerization system under the following condition:

$$16 < Y - X < 83$$

wherein X and Y are percentages of the amount of a polymer produced at the time of starting the addition and the amount of a polymer produced at the time of finishing the addition, respectively, based on the amount of the whole polymer to be produced. The fiber has an excellent flame resistance and an excellent devitrification preventing property. Also, when the polymerization is conducted in emulsion polymerization manner under additional condition that Y is more than 71, the obtained emulsion is very stable and the polymer can be recovered from the emulsion in improved drying efficiency.

12 Claims, No Drawings

MODACRYLIC SYNTHETIC FIBER HAVING AN EXCELLENT DEVITRIFICATION PREVENTING PROPERTY AND A PROCESS FOR PREPARING THE SAME

This is a continuation of application Ser. No. 264,618 filed May 18, 1981, now abandoned.

BACKGROUND OF THE INVENTION

The present invention relates to a novel modacrylic synthetic fiber having a flame resistance and an excellent devitrification preventing property and a process for preparing the modacrylic fiber.

Acrylic fibers have various excellent chemical and physical properties such as dyeing ability, hand touchness and fastness to light. In recent years, a demand for antiflaming of textile goods is rapidly increasing, and in particular, the flammability of acrylic fibers is in significant question. Acrylic fibers are essentially lacking in flame resistance, and accordingly are unsuitable for use in interior goods requiring antiflammability such as curtain and carpet, and clothes for babies, children and the old.

In order to improve this defect, there have hitherto been proposed various processes, e.g. a process in which a flame proofing agent is added to a spinning solution and the spinning is conducted, a process in which a flame proofing agent is incorporated into fibers by post-treatment, and a process in which a mixture of a flame resisting polymer and an acrylic polymer is extruded into a coagulation bath. However, these processes are not satisfactory for the reason that necessity of the use of large amounts of a flame proofing agent decreases the physical properties and hand touchness of acrylic fibers, or the flame resistance decreases due to elution of a flame proofing agent in dyeing and washing, or industrial production by a mix spinning process is difficult due to difficulty in maintining a mixed spinning solution uniform and stable.

On the other hand, as a process for semipermanently imparting flame resistance to acrylic fibers, there has been carried out a process in which acrylonitrile is copolymerized with a halogen-containing monomer such as vinyl chloride, vinylidene chloride, vinyl bromide or vinylidene bromide. In that case, the larger the content of a halogen in the obtained copolymer, the better the flame resistance. However, the process has a fatal defect that the devitrification preventing property is remarkably lowered with increasing the halogen content, whereby physical properties, processing property and commercial value of the fibers are impaired. The reason is considered to be that since acrylic fibers containing a large amount of halogenated vinyl monomer units are generally prepared by a wet spinning process, fine voids are easy to be formed in fiber structure, and moreover since the softening point of fibers is low, the fibers are easy to swell in a relatively low temperature range. For such reasons, it is particularly important to prevent the formation of fine voids in fiber structure in a coagulation bath in order to improve the devitrification property.

In case of the so-called acrylic synthetic fibers containing not less than 85% by weight of acrylonitrile, prevention of the devitrification has been generally conducted by copolymerizing with a sulfo group-containing vinyl monomer which also provides the fibers with dyeing sites. However, in case of the so-called modacrylic synthetic fibers which contain a large amount of halogenated vinyl monomer units, it is essentially difficult to form a dense fiber structure and, therefore, not only prevention of the devitrification is very difficult even if a sulfo group-containing vinyl monomer is incorporated, but also the incorporation of a sulfo group-containing vinyl monomer may rather bring about further decrease of devitrification preventing property. For such a reason, modacrylic fibers having both the satisfactory flame resistance and the devitrification preventing property have not yet been obtained. It is of urgent necessity for the fiber and textile industry to raise the devitrification preventing property of modacrylic fibers to the degree of the acrylic fibers.

Improvement of the devitrification of modacrylic fibers from the polymerization side is disclosed in Japanese Patent Publication Nos. 9299/1978 and 9300/1978, in which an acrylonitrile copolymer containing anionic monomer units in large quantities is added to the polymerization system and the polymerization is conducted in the presence of such a hydrophilic copolymer in a solution polymerization manner. However, these processes are not industrially advantageous. That is to say, since in these processes the hydrophilic copolymer must be previously prepared and added to the polymerization system before starting the solution polymerization, it is necessary to separately prepare the hydrophilic copolymer and to adjust the amount of the hydrophilic copolymer added depending on the polymerization yield in order to obtain stable properties of the fibers. Therefore, the procedure is very troublesome. Also, the obtained spinning solution is hard to maintain in a uniform solution, since the difference in the hydrophilic and hydrophobic properties of the mixed copolymers is relatively large. In case of using an acrylonitrile copolymer having a large hydrophilic property, there are cases where the hydrophilic copolymer is not dissolved or merely swelled depending on the kinds of the organic solvents used. The use of such a spinning solution lacking in uniformity causes troubles in spinning such as choking of nozzle and breaking of spinning fiber, and accordingly stable preparation of fibers is difficult. Furthermore, since the copolymer having a large hydrophilic property is easy to elute into a coagulation bath and a washing bath, the devitrification preventing effect is decreased and also fibers having a good dyeing ability is hard to stably obtain.

Also, in general, a solution polymerization process has a tendency that an average degree of polymerization of the produced polymer is easy to lower due to occurrence of chain transfer reaction between a solvent molecule and a propagating high molecule radical depending on the used solvent. Therefore, the physical properties and devitrification preventing property of fibers are hard to maintain. Further, a solution polymerization process has the defect that because of slow polymerization rate, the polymerization time is long and the reaction mixture is easy to be colored. These tendencies are particularly remarkable in the preparation of acrylonitrile copolymers containing vinyl chloride. For such a reason, adoption of a solution polymerization is relatively rare in the preparation of acrylonitrile copolymers containing vinyl chloride among acrylonitrile copolymers having a relatively low acrylonitrile content used as raw materials of modacrylic fibers.

It is an object of the present invention to provide a modacrylic fiber having excellent flame resistance and devitrification preventing property.

A further object of the invention is to provide a process for preparing a modacrylic fiber having excellent flame resistance and devitrification preventing property.

These and other objects of the present invention will become apparent from the description hereinafter.

SUMMARY OF THE INVENTION

It has now been found that a modacrylic fiber made from a copolymer containing as main components acrylonitrile and at least one of vinyl chloride and vinylidene chloride in a specific ratio has a high flame resistance, and that when in the preparation of the copolymer a sulfo group-containing vinyl monomer is copolymerized in a particular manner, the copolymer provides a modacrylic fiber having an excellent devitrification preventing effect.

In accordance with the present invention, there is provided a modacrylic synthetic fiber comprising a copolymer of 40 to 65% by weight of acrylonitrile, 31 to 59.9% by weight of at least one of vinyl chloride and vinylidene chloride and 0.1 to 4% by weight of a sulfo group-containing vinyl monomer, the ratio of the reactivity of said sulfo group-containing vinyl monomer to that of acrylonitrile being at least 1, and said copolymer being one prepared by polymerizing under the condition satisfying the following equation:

$$16 < Y - X < 83$$

wherein X is a percentage of the amount of a polymer produced at the time of starting the addition of the sulfo group-containing vinyl monomer to the amount of the whole polymer to be produced, and Y is a percentage of the amount of a polymer produced at the time of finishing the addition of the sulfo group-containing vinyl monomer to the amount of the whole polymer to be produced.

There is also provided a process for preparing a modacrylic synthetic fiber which comprises polymerizing 40 to 65% by weight of acrylonitrile, 31 to 59.9% by weight of at least one of vinyl chloride and vinylidene chloride and 0.1 to 4% by weight of a sulfo group-containing vinyl monomer, the ratio of the reactivity of said sulfo group-containing vinyl monomer to that of acrylonitrile being at least 1, under the condition satisfying the following equation:

$$16 < Y - X < 83$$

wherein X is a percentage of the amount of a polymer produced at the time of starting the addition of the sulfo group-containing vinyl monomer to the amount of the whole polymer to be produced, and Y is a percentage of the amount of a polymer produced at the time of finishing the addition of the sulfo group-containing vinyl monomer to the amount of the whole polymer to be produced, and spinning the resulting copolymer

DETAILED DESCRIPTION

It is necessary that the acrylonitrile copolymer used for the preparation of modacrylic fibers is a copolymer containing as main components 40 to 65% by weight of acrylonitrile and 31 to 59.9% by weight of at least one of vinyl chloride and vinylidene chloride. When the content of acrylonitrile is less than 40% by weight, it is difficult to produce a synthetic fiber having necessary properties as a textile fiber, including the divitrification preventing property, and when the content of acrylonitrile is more than 65% by weight, a high flame resistance is hard to obtain, though the characteristics required for synthetic fibers are satisfied. Also, when the content of vinyl chloride and/or vinylidene chloride is less than 31% by weight, a high flame resistance is hard to obtain, and when the content is more than 59.9% by weight, it is hard to produce a synthetic fiber having necessary properties as a textile fiber, though the obtained fibers are resistant to flame. It is preferred from the viewpoint of the flame resistance that the copolymer contains not less than 15% by weight, especially not less than 20% by weight, of vinyl chloride.

It is essential for the present invention that the copolymer further contains a specific amount of a sulfo group-containing vinyl monomer as a component of the copolymer, in addition to acrylonitrile and vinyl chloride and/or vinylidene chloride. As mentioned after, the preparation of the copolymer is carried out by polymerizing acrylonitrile and at least one of vinyl chloride and vinylidene chloride, while adding the sulfo group-containing vinyl monomer to the polymerization system in a specific manner so as to produce a hydrophilic copolymer containing the sulfo group-containing vinyl monomer and a hydrophobic copolymer not containing it. Accordingly, in the present invention, the content of a monomer component means the content of a monomer component in the whole polymers produced.

Also, the copolymer may contain a small amount of a monoolefinic monomer copolymerizable with acrylonitrile, vinyl chloride, vinylidene chloride and the sulfo group-containing vinyl monomer. The copolymerizable monoolefinic monomer includes, for instance, acrylic acid, methacrylic acid, acrylates, methacrylates, acrylamide, methacrylamide, vinyl acetate, vinyl bromide, and the like. Usually, these copolymerizable monomers are contained in an amount of at most 10% by weight based on the total amount of the polymerized monomers without causing any troubles.

It is further necessary that the acrylonitrile copolymer containing the halogenated vinyl monomer used in the present invention contains 0.1 to 4% by weight of a sulfo group-containing vinyl monomer having a relative reactivity of at least 1 to acrylonitrile and is prepared by conducting the polymerization under the condition satisfying the following equation (1):

$$16 < Y - X < 83 \qquad (1)$$

preferably $$33 < Y - X < 75 \qquad (1')$$

wherein X is a percentage of the amount of a polymer produced at the time of starting the addition of the sulfo group-containing vinyl monomer to the amount of the whole polymer to be produced, and Y is a percentage of the amount of a polymer produced at the time of finishing the addition of the sulfo group-containing vinyl monomer to the amount of a whole polymer to be produced. In the polymerization, the sulfo group-containing vinyl monomer is added to the polymerization system in the specific manner as defined by the above equation (1). When the value of (Y−X) is not more than 16% by weight, the proportion of the copolymer containing the sulfo group-containing vinyl monomer units in the produced whole polymer molecules is small, and the so produced copolymer containing the sulfo group-containing monomer units has a relatively high hydrophilic property. Therefore, since a spinning solution prepared from the so obtained polymer is lacking in uniformity, not only choking of a nozzle and breaking of spinning fiber occur frequently, but also the hydrophilic polymer is easy to elute in a coagulation bath and a washing bath, resulting in lack of fiber characteristics such as devitrification preventing property and dyeing ability. Thus, no fibers of stable quality are obtained. Also, when the value of $(Y-X)$ is not less than 83% by weight, the copolymer containing the sulfo group-containing vinyl monomer units is produced in a large amount, but the content of the sulfo group-containing vinyl monomer component in respective polymer molecules is small. Therefore, it is hard to provide fibers with a dense coagulation structure in a coagulation bath, and the improvement of devitrification is difficult.

It is necessary to select a sulfo group-containing vinyl monomer so that the ratio of its reactivity to the reactivity of acrylonitrile is at least 1. When the relative reactivity is less than 1, the copolymerizability of the sulfo group-containing vinyl monomer is poor. Therefore, the sulfo group-containing vinyl monomer does not copolymerize the moment it is added to the polymerization system, and also after stopping the addition thereof, it remains as an unreacted monomer due to poor reactivity and the copolymerization proceeds slow. Therefore, the copolymer containing the sulfo group-containing vinyl monomer component in an effective amount for devitrification prevention cannot be efficiently produced in an effective proportion for devitrification prevention based on the whole polymer produced. The reason why the devitrification preventing property can be improved by the polymer containing the sulfo group-containing vinyl monomer having a relative reactivity of at least 1 is not clear. However, it is considered that because such a sulfo group-containing vinyl monomer has a high copolymerizability, it begins to copolymerize promptly after the addition to the polymerization system, and when stopping the addition, the reaction of the sulfo group-containing vinyl monomer is immediately finished and it scarcely remains in the system as an unreacted monomer, and that as a result, a hydrophilic copolymer containing the sulfo group-containing vinyl monomer and a hydrophobic copolymer not containing it are very smoothly, quantitatively produced so as to provide, as a whole, the copolymer having an effective amount of copolymerization of sulfo group-containing vinyl monomer and an effective composition for devitrification prevention. Further, in the present invention, a copolymer containing the sulfo group-containing vinyl monomer and a copolymer not containing it are produced in the same polymerization system and, therefore, copolymer molecules containing a less amount of the sulfo group-containing vinyl monomer units as compared with the desired hydrophilic copolymer are produced in a trace amount at the time of starting or finishing the addition of the sulfo group-containing vinyl monomer to the polymerization system. It is considered that such a copolymer also assists the formation of a dense coagulation structure effective for devitrification prevention.

The sulfo group-containing vinyl monomer employed in the present invention includes, for instance, methacryloyloxypropylsulfonic acid, styrene sulfonic acid, vinylbenzyl sulfonic acid, their salts such as sodium salt, potassium salt and ammonium salts, and the like. These monomers may be employed alone or in admixture thereof.

The amount of the sulfo group-containing vinyl monomer is from 0.1 to 4% by weight, preferably 0.3 to 2% by weight based on the total amount of the monomers polymerized. When the amount is less than 0.1% by weight, since the difference in the hydrophilic property between the copolymer containing the sulfo group-containing vinyl monomer and the copolymer not containing it is small, it is difficult to provide a dense coagulation structure. Also, when the amount is more than 4% by weight, the difference in the hydrophilic property becomes too large, and the coagulation occurs ununiformly so as to form voids in large quantities in fibers or the copolymer containing the sulfo group-containing vinyl monomer elutes into a coagulation bath and a washing bath. Therefore, it is hard to obtain stably desired qualities such as the devitrification preventing property and dyeing ability. In addition, the use of the sulfo group-containing vinyl monomer in a large amount increases the preparation cost and is economically disadvantageous.

The addition of the sulfo group-containing vinyl monomer to the polymerization system is carried out in a continuous or intermittent addition manner. Also, the sulfo group-containing vinyl monomer may be added at a constant rate, or by equal portions, or in a gradually increasing or decreasing amount. Continuous addition at a constant rate is particularly preferable.

Although the reason why the devitrification is prevented is not clear, it is necessary to prevent the formation of fine voids in the fiber structure in a coagulation bath for improving the devitrification preventing property upon preparing modacrylic fibers containing a large amount of a halogenated vinyl monomer. For this purpose, it is essential to prepare a polymer capable of forming continuously a uniform, dense coagulation structure in a coagulation bath. In the polymer of the present invention, the proportion of the copolymer containing the sulfo group-containing vinyl monomer in the produced polymer and the content of the sulfo group-containing vinyl monomer component in the respective copolymer molecules are well balanced. For this reason, it is considered that the hydrophilic copolymer and the hydrophobic copolymer ideally form a complete whole so as to continuously cause a uniform precipitating behavior, whereby a dense coagulation structure is formed so as to prevent the devitrification.

The copolymer may also contain a low-reactive sulfo group-containing vinyl monomer having a relative reactivity of less than 1 to acrylonitrile, e.g. allylsulfonic acid, 2-methylallylsulfonic acid or their salts such as alkali metal salts and ammonium salts, so far as the difference between the hydrophilic property and the hydrophobic property of the produced polymers is maintained. Usually, the amount of the low-reactive sulfo group-containing vinyl monomer included in the copolymer is at most 1% by weight, preferably at most 0.5% by weight, based on the total amount of the monomers polymerized.

The copolymer useful for preparing modacrylic fibers of the present invention is prepared in any known processes, e.g. emulsion or suspension polymerization in an aqueous medium or an aqueous medium containing an organic solvent, and solution polymerization. As a polymerization catalyst, there are employed usual radical polymerization initiators, e.g. persulfates, combination of persulfates and hydrogensulfites, azo compounds such as azo-bis-isobutyronitrile and azo-bis-dimethylvaleronitrile, and peroxides such as benzoyl peroxide.

The present inventors have also found that when the polymerization is carried out in an emulsion polymerization manner under the condition satisfying, in addition to the equation (1), the following equation (2):

$$Y > 71 \qquad (2)$$

wherein Y is an defined above, the obtained emulsion is stable and the copolymer can be economically recovered from the emulsion as compared with a conventional emulsion polymerization process. Thus, the present invention also provides an improvement of a conventional emulsion polymerization process.

In case of the emulsion polymerization, the upper limit, 65% by weight, of the acrylonitrile content in the copolymer has a further important meaning. That is to say, when the acrylonitrile content is more than 65% by weight, it is difficult to maintain the obtained emulsion stable, and also upon recovering the copolymer in the form of powder from the emulsion by salting-out to coagulate the copolymer, filtering, washing with water, dehydrating and drying, the water content of a wet polymer at the time of dehydration becomes high and the drying efficiency is lowered.

Also, in the emulsion polymerization, it should be avoided to include the sulfo group-containing vinyl monomer in the copolymer in an amount exceeding 4% by weight, particularly for the reason that the hydrophilic copolymer becomes easy to elute at the time of filtration, washing and dehydration after salting-out in recovery and desired properties such as the devitrification preventing property and the dyeing ability are not stably obtained.

An emulsion polymerization process has in general the advantages, as compared with a solution polymerization process, that not only the polymerization rate is large, but also an average degree of polymerization of the produced polymer is large, and that in the preparation of the acrylonitrile copolymer containing vinyl chloride, it is particularly easy to maintain high the properties required for synthetic fibers, including the devitrification preventing property. Therefore, in the emulsion polymerization process according to the present invention, it is desirable to employ vinyl chloride from the viewpoint of the above advantage of the emulsion polymerization, in addition to the viewpoint of the flame resistance. The vinyl chloride content of not less than 15% by weight, especially not less than 20% by weight is preferable.

In the emulsion polymerization, it is important that the value Y is more than 71% by weight, in other words, it is important that the addition of the sulfo group-containing vinyl monomer is not completed before 71% by weight of the polymer to be produced is produced. If the value Y is not more than 71% by weight, the formed emulsion is unstable and is easy to coagulate and, therefore, it is difficult to stably proceed with the polymerization by the use of a usual amount of an emulsifier or to stably store the obtained emulsion, though desirable in drying efficiency upon recovering the polymer from the emulsion, since the water content of the wet polymer obtained by salting-out of the emulsion, filtration and washing with water is low. The value Y within the range of 75 to 96% by weight is more preferred, since the obtained emulsion is further stabilized. When the value Y is more than 96% by weight, the water content of the wet polymer becomes high and the drying efficiency tends to lower. It is unexpected facts that by selecting the value Y, the emulsion can be easily maintained stable and moreover the wet polymer obtained from the emulsion has a reduced water content, whereby the drying efficiency can be increased and thus the polymer powder can be economically recovered from the emulsion. The reason is considered to be that the polymer perticles in the emulsion is maintained stable by the well-balanced electric potential of the particle surface and, therefore, at the time of salting-out and coagulation they coagulate in uniform state suitable for washing and dehydration so as to optimize the filtration and to lower the water content.

Anionic surface active agents are particularly effective as surface active agents used in the emulsion polymerization, e.g. fatty acid salts, sulfates, sulfonates and phosphates. The anionic surface active agent may be employed in combination with a small amount of a usual non-ionic surface active agent. The larger the amount of the surface active agent used, the better the quality of the obtained polymer. However, when the surface active agent is employed in large quantities, the water content of the wet polymer upon recovering becomes very high, and the drying efficiency and the quality of waste water from a polymerization step are decreased. Therefore, the surface active agent is preferably employed in an amount of 0.1 to 10% by weight, especially 0.2 to 5% by weight, based on the total weight of the monomers.

Any usual radical polymerization initiators are usable in the emulsion polymerization, e.g. persulfates which are thermal decomposition type initiators, and redox initiators such as combinations of a persulfate and a ferrous salt; Fenton's reagent consisting of hydrogen peroxide and a ferrous salt; a persulfate and sodium thiosulfate; a persulfate and sodium hydrogensulfite; and hydrogen peroxide and a hydroxycarboxylic acid.

The emulsion polymerization is carried out in an aqueous medium usually at a temperature of 30° to 70° C. Preferably, the concentration of the monomers in the emulsion polymerization is from 10 to 50% by weight based on the total weight of the polymerization system. The aqueous polymerization medium may contain a small amount of an organic solvent miscible with water.

The produced polymer is recovered from the resulting emulsion usually by salting-out with an aqueous solution of electrolytes, e.g. salts such as sodium chloride, calcium chloride, magnesium sulfate and aluminum sulfate, to separate the polymer, and then filtering, washing with water, dehydrating and drying the polymer to give a polymer powder.

According to the improved emulsion polymerization of the present invention, the obtained emulsion is very stable and also the polymer can be economically recovered from the emulsion, and moreover a modacrylic fiber prepared from the polymer has excellent flame resistance and devitrification preventing property.

Usual wet and dry spinning processes are adoptable for the preparation of a modacrylic fiber from the polymer of the present invention, and a wet spinning process is particularly preferable. Usual solvents for acrylonitrile polymers may be employed as solvents for preparing a spinning solution, e.g. acetonitrile, acetone, dimethylacetoamide, dimethylformamide and dimethylsulfoxide. The spinning solution may contain usual additives such as a heat or light stabilizer, an additive for improving the hand touchness and a flame proofing agent.

The present invention is more particularly described and explained by means of the following Examples, in which all parts and % are by weight unless otherwise noted.

In the following Examples, the flame resistance and devitrification preventing property of a fiber and the water content of a wet polymer obtained by salting-out of an emulsion are measured as follows:

The flame resistance is measured by the limited oxygen index method employing an limited oxygen index combustion tester. Each sample used in the measurement is prepared in the following way. First, six multifilaments, each having 300 single filaments (single filament: 3 deniers), are twisted 75 turns per 25 inches and two of such twisted filaments are then combined together to form a rope. The sample is then shrinked by 70% and is put in a holder of a combustion tester in an erect posture. The sample is burnt, and oxygen percent necessary to keep burning by 5 cm. is measured. The larger the value, the better the flame resistance.

The devitrification preventing property is estimated by percent transmission. A filament of 3 deniers is treated in a boiling water for 30 minutes, and is cut to 3 mm. long. Then, 200 mg. of the cut filaments is uniformly interposed between silica glass plates and put in a silica cell having a thickness of 1 cm. charged with 3 ml. of p-chlorotoluene. The percent transmission of the boiling-treated filament is measured by a spectrophotometer at 650 mμ in wavelength employing the untreated filament as a reference sample. The larger the percent transmission, the better the devitrification preventing property.

The water content of a wet polymer obtained by salting-out of an emulsion in recovery of a polymer from the emulsion is measured as follows: To 1,000 ml. of an emulsion heated to 55° C. is added 100 ml. of a 20% aqueous solution of sodium chloride with stirring. The resulting slurry of a polymer is further stirred with heating to 90° C., and after maintaining at 90° C. for 8 minutes, the slurry is cooled to 70° C. A filter equipped with a polyester filter cloth (air permeability: 45 cm./sec.) having a diameter of 12 cm. is dipped in the slurry for 5 seconds under a pressure of 200 mmHg, thereby attaching the slurry slightly dehydrated to the filter cloth, and the dehydration of the attached slurry is then conducted in an atmosphere by sucking under a reduced pressure of 200 mmHg for 30 seconds. The water content of the thus obtained wet polymer is calculated according to the following equation:

$$\text{Water content (\% by weight)} = \frac{W - W_o}{W_o} \times 100$$

wherein W is the weight of the obtained wet polymer and Wo is the weight of the polymer dried at 70° C. for 6 hours.

Also, in the following Examples, the yield of a polymer shows a value calculated accroding to the following equation:

Yield of polymer (% by weight) =

$$\frac{(\text{Amount of polymer produced}) \times 100}{\left(\begin{array}{l}\text{Total amount of}\\\text{monomers added to}\\\text{polymerization}\\\text{system}\end{array}\right) - \left(\begin{array}{l}\text{Amount of unreacted}\\\text{vinyl chloride}\\\text{recovered}\end{array}\right)}$$

EXAMPLE 1

In a 15 liter pressure polymerization vessel, emulsion polymerization was carried out by employing 40.4 parts of acrylonitrile, 12.8 parts of vinylidene chloride, 46.1 parts of vinyl chloride, 260 parts of water, a redox polymerization initiator of 0.18 part of ammonium persulfate and 0.72 part of sodium hydrogen-sulfite, and 0.89 part of sodium laurylsulfate as an emulsifier. The polymerization system was adjusted to pH 2.2, and the polymerization was continued at 38° C. for 7 hours.

In the emulsion polymerization, 0.7 part of sodium vinylbenzylsulfonate as a sulfo group-containing vinyl monomer was added continuously at a constant rate to the polymerization system over a period from 2 hours (yield of polymer: 29.3%) to 6 hours (yield of polymer: 85.4%) after the polymerization was started. Also, 29.6 parts out of 40.4 parts of acrylonitrile and 4.6 parts out of 12.8 parts of vinylidene chloride were added continuously to the system through the polymerization in order to maintain the composition of the produced polymer uniform, and 0.16 part out of 0.18 part of ammonium persulfate was added continuously to the system in order to maintain the polymerization rate constant.

The thus produced polymer had a composition of 49.2% of acrylonitrile, 15.3% of vinylidene chloride, 34.6% of vinyl chloride and 0.9% of sodium vinylbenzylsulfonate. The yield of the polymer at the time when 18.7 parts of unreacted vinyl chloride was recovered was 96.8%.

The percentage of the polymer produced at the time of finishing the addition of sodium vinylbenzylsulfonate to the polymer produced finally, namely the value Y, was 88.2%. Also, the value of (Y−X) was 58.0%. The obtained reaction mixture in the form of emulsion was stable, even if it was allowed to stand for more than one month. Salting-out was conducted by adding 2 parts of sodium chloride to 100 parts of the emulsion, and the water content of the wet polymer obtained by salting-out was measured. The water content was 98.5%.

The recovered polymer in the form of powder was dissolved in acetone to give a 30% spinning solution. Wet spinning was conducted by extruding the spinning solution into a coagulation bath containing a water-acetone mixed solvent (65:35 by weight), washing the formed filament with water, drying, drawing and heat-treating to give a modacrylic fiber. The percent transmission of the fiber was 78.8% and the limited oxygen index was 32.2 and, therefore, the fiber had excellent devitrification preventing property and flame resistance.

EXAMPLES 2 TO 4 AND COMPARATIVE EXAMPLES 1 AND 2

Emulsion polymerization was carried out according to the procedure of Example 1. Acrylonitrile, vinylidene chloride and vinyl chloride were employed in amounts shown in Table 1. Also, the amount of a polymerization catalyst was controlled according to the composition of the monomers so that the yield of the obtained polymer was from 95 to 97%, and sodium vinylbenzylsulfonate was added continuously to the polymerization system at a constant rate so that the (Y−X) value was from 50 to 60% and the Y value was from 80 to 90%.

The obtained polymer was dissolved in dimethylformamide to prepare a spinning solution, and a synthetic fiber was prepared by a wet spinning process using a water-dimethylformamide mixed solvent as a coagulation bath.

The composition of the obtained polymer, stability of the emulsion, water content of the wet polymer obtained in recovery from the emulsion, and the devitrification preventing property (percent transmission) and flame resistance of fiber are shown in Table 1.

was finished in a range from 4 to 7 hours after the initiation of the polymerization.

The obtained polymers had a composition of 49.4% of acrylonitrile, 50.0% of vinyl chloride and 0.6% of sodium styrenesulfonate. The yield of polymer was about 96%.

The polymers were recovered from the obtained emulsions by salting-out. Spinning solutions were prepared by dissolving the polymers in acetone, and wet spinning was conducted to give synthetic fibers. The limited oxygen index value of all fibers obtained was 28.1 because of the same polymer composition, and the flame resistance was good.

Stability of emulsion, water content of wet polymer

TABLE 1

|  | Composition of polymer (%) |  |  |  | Y-X (%) | Y (%) | Stability of emulsion | Water content (%) | Percent transmission | Flame resistance |
| --- | --- | --- | --- | --- | --- | --- | --- | --- | --- | --- |
|  | AN | VD | VC | VBSA |  |  |  |  |  |  |
| Ex. 2 | 46.1 | 10.5 | 42.6 | 0.8 | 54.1 | 84.5 | good | 96.1 | 75.4 | 31.3 |
| Ex. 3 | 51.3 | 15.8 | 32.1 | 0.8 | 56.7 | 86.3 | good | 102.4 | 81.8 | 31.0 |
| Ex. 4 | 60.4 | 18.5 | 20.2 | 0.9 | 56.4 | 86.2 | good | 119.6 | 84.7 | 30.2 |
| Com. Ex. 1 | 73.6 | 3.4 | 22.1 | 0.9 | 55.3 | 86.6 | slightly bad | 152.8 | 88.5 | 24.9 |
| Com. Ex. 2 | 36.7 | 5.9 | 56.6 | 0.8 | 54.2 | 88.3 | good | 92.2 | 36.9 | 31.7 |

(Note)
AN: Acrylonitrile
VD: Vinylidene chloride
VC: Vinyl chloride
VBSA: Sodium vinylbenzylsulfonate As is clear from the results of Examples 2 to 4, according to the present invention, stable emulsions were prepared and the wet polymers obtained by salting-out of the emulsions had a low water content, i.e. water content of less than 120%, and also the fibers had an excellent devitrification preventing property and an excellent flame resistance. On the other hand, the polymer of Comparative Example 1 had a large acrylonitrile content and, therefore, the obtained emulsion was somewhat lacking in stability and also the drying efficiency was bad due to high water content. Further, the flame resistance of the fiber was less than 26 in the limited oxygen index and was not satisfactory. In Comparative Example 2, stability of emulsion, water content and flame resistance were satisfactory, but physical properties and devitrification preventing property of the fiber were bad due to low acrylonitrile content.

EXAMPLES 5 TO 11 AND COMPARATIVE EXAMPLES 3 TO 6

In order to observe the effect of the values Y and X on characteristics of polymer and devitrification preventing property, emulsion polymerization was carried out, in which the time of starting or finishing the addition of a sulfo group-containing vinyl monomer was changed. In the polymerization, there were employed 40.4 parts of acrylonitrile, 59.1 parts of vinyl chloride, 270 parts of water, 0.8 part of sodium laurylsulfate as an emulsifier and a combination of ammonium persulfate and sodium hydrogensulfite as a polymerization initiator. The polymerization system was adjusted at pH 2.3, and the polymerization was carried out at 39° C. for 7 hours.

Upon carrying out the polymerization, gradual continuous addition of 0.5 part of sodium styrenesulfonate as a sulfo group-containing vinyl monomer was started in 6 hours after the initiation of the polymerization and recovered and devitrification preventing property (percent transmission) are shown in Table 2.

TABLE 2

|  | Y-X (%) | Y (%) | Stability of emulsion | Water content (%) | Percent transmission |
| --- | --- | --- | --- | --- | --- |
| Ex. 5 | 34.8 | 81.6 | good | 96.7 | 82.4 |
| Ex. 6 | 42.5 | 90.7 | good | 99.5 | 83.5 |
| Ex. 7 | 53.4 | 74.8 | good | 93.7 | 84.8 |
| Ex. 8 | 55.3 | 87.4 | good | 97.8 | 85.1 |
| Ex. 9 | 52.6 | 94.8 | good | 117.6 | 84.4 |
| Ex. 10 | 71.7 | 92.2 | good | 109.3 | 80.5 |
| Ex. 11 | 63.6 | 63.6 | bad | 92.0 | 80.8 |
| Com. Ex. 3 | 12.4 | 68.8 | slightly bad | 92.1 | 42.4 |
| Com. Ex. 4 | 11.7 | 84.6 | good | 99.2 | 40.7 |
| Com. Ex. 5 | 90.5 | 98.2 | good | 123.0 | 62.2 |
| Com. Ex. 6 | 100.0 | 100.0 | good | 126.9 | 57.7 |

According to the present invention (Examples 5 to 11), the water content of the wet polymers obtained in the course of recovery of polymer powder from the emulsions was less than 120% and, therefore, drying efficiency was very good. Also, the percent transmission of the fibers was more than 70%, so the devitrification preventing property was very excellent. Further, when the emulsion polymerization was conducted under the condition of the value Y more than 71%, the obtained emulsion was very stable.

In case of Comparative Examples 3 to 6, the (Y−X) condition in polymerization is not satisfied and, therefore, the devitrification preventing property was very bad.

EXAMPLE 12

In a 15 liter pressure polymerization vessel, solution polymerization was carried out by employing 54.7 parts of acrylonitrile, 18.8 parts of vinylidene chloride, 26.0 parts of vinyl chloride, 0.5 part of sodium vinylbenzylsulfonate, 200 parts of dimethylsulfoxide as a solvent and azo-bis-dimethylvaleronitrile as a polymerization initiator, in a manner such that sodium vinylbenzylsulfonate was continuously added to the polymerization system at a constant rate so that the value X became 28.8% and the value Y became 83.6%, and such that a part of acrylonitrile and vinylidene chloride to be used was continuously added to the polymerization system with the progress of the polymerization in order to maintain the composition of the produced polymer uniform.

The thus produced polymer had a composition of 61.3% of acrylonitrile, 20.4% of vinylidene chloride, 17.5% of vinyl chloride and 0.8% of sodium vinyl-benzylsulfonate. The resulting reaction mixture in the form of solution was diluted to 22% in concentration of the polymer to give a spinning solution, and wet spinning was conducted by extruding the spinning solution into a water-dimethylsulfoxide mixed solvent. The percent transmission and the limited oxygen index of the obtained fiber were 76.6% and 29.6, respectively and, therefore, the fiber had an excellent devitrification preventing property and an excellent flame resistance.

EXAMPLES 13 TO 17 AND COMPARATIVE EXAMPLES 7 TO 10

Emulsion polymerization was carried out in the same manner as in Example 1 except that the kind and amount of sulfo group-containing vinyl monomers were changed as shown in Table 3 and the (Y−X) value and the Y value were in the ranges of 56 to 60% and 87 to 89%, respectively.

Also, as comparison, there were conducted the polymerization using no sulfo group-containing vinyl monomer (Comparative Example 7), the polymerization using sodium vinylbenzylsulfonate in a large amount (Comparative Example 8), and the polymerization using sulfo group-containing vinyl monomers having a relative reactivity of less than 1 to acrylonitrile, i.e. sodium 2-methylallylsulfonate (Comparative Example 9) and sodium allylsulfonate (Comparative Example 10). In Comparative Examples 9 and 10, the amount of the polymerization initiator used was controlled so that the polymer was produced in a yield of about 97% in the polymerization for 7 hours, since the polymerization rate was slow.

The thus obtained polymers contained 48 to 50% of acrylonitrile, 14 to 16% of vinylidene chloride and 34 to 36% of vinyl chloride.

The polymers were dissolved in acetone to give spinning solutions having a concentration of 30%, and modacrylic fibers were prepared by extruding the solutions into a coagulation bath containing a water-acetone mixed solvent (65:35 by weight). The limited oxygen index of each fiber obtained was about 31 to about 32, and the flame resistance was good.

The results are shown in Table 3.

TABLE 3

| | Sulfo group-containing vinyl monomer | | | Water | |
|---|---|---|---|---|---|
| | Kind | Amount (part) | Stability of emulsion | content (%) | Percent transmission |
| Ex. 13 | Sodium methacryloyloxy-propylsulfonate | 0.6 | good | 95.3 | 82.5 |
| Ex. 14 | Sodium styrenesulfonate | 0.6 | good | 93.6 | 82.2 |
| Ex. 15 | Ammonium styrenesulfonate | 0.6 | good | 96.4 | 81.7 |
| Ex. 16 | Sodium vinylbenzylsulfonate | 0.6 | good | 96.0 | 80.1 |
| Ex. 17 | Sodium vinylbenzylsulfonate | 2.0 | good | 112.6 | 76.1 |
| Com. Ex. 7 | — | 0 | slightly bad | 118.5 | 54.4 |
| Com. Ex. 8 | Sodium vinylbenzylsulfonate | 6.0 | good | 175.8 | 31.0 |
| Com. Ex. 9 | Sodium 2-methylallylsulfonate | 0.6 | bad | 134.4 | 54.8 |
| Com. Ex. 10 | Sodium allylsulfonate | 0.6 | bad | 146.3 | 46.5 |

In case of Examples 13 to 17 using sulfo group-containing vinyl monomers having a relative reactivity of at least 1 to acrylonitrile, the obtained emulsions were very stable, the water content of the wet polymers obtained in the course of recovery of polymer powder from the emulsions was low, i.e. less than 120%, and also the devitrification preventing property was very excellent.

On the other hand, in case of Comparative Example 7 using no sulfo group-containing vinyl monomer, the stability of the obtained emulsion was slightly bad, and also the percent transmission of the fiber was less than 60% and accordingly the devitrification perventing property was bad. Further, in case of Comparative Example 8 using a sulfo group-containing vinyl monomer in a large amount, the water content was high and the drying efficiency was bad. Also, the spinning solution prepared from the recovered polymer powder contained an acetone-insoluble matter, and accordingly the spinning property was bad and the devitrification preventing property was very bad.

In case of Comparative Examples 9 and 10, the polymerization rate lowered by the addition of sodium 2-methylallylsulfonate or sodium allylsulfonate to the polymerization system. The reason is considered to be caused by occurrence of chain transfer reaction with propagating high polymer molecule radicals. Therefore, the polymerization rate was maintained by using an increased amount of the polymerization initiator. The obtained emulsions were lacking in stability, and the water content of the wet polymers was high, i.e. more than 130%. Also, the obtained fibers were poor in devitrification preventing property, and moreover the dyeing ability was not satisfactory. The reason is considered to be that the produced polymers have not an effective content of a sulfo group-containing vinyl monomer component in a polymer molecule and an effective proportion of a polymer containing a sulfo group-containing monomer component.

What we claim is:

1. A process for preparing a modacrylic synthetic fiber which comprises polymerizing monomers consisting essentially of acrylonitrile, at least one of vinyl chloride and vinylidene chloride, and a sulfo group-containing vinyl monomer to produce a copolymer consisting essentially of 40 to 65% by weight of acrylonitrile, 31 to 59.9% by weight of at least one of vinyl chloride and vinylidene chloride and 0.3 to 4% by weight of a sulfo group-containing vinyl monomer, the ratio of the reactivity of said sulfo group-containing vinyl monomer to that of acrylonitrile being at least 1, under the condition satisfying the following equation:

$$33 < Y - X < 75$$

wherein X is a percentage of the amount of a polymer produced at the time of starting the addition of the sulfo group-containing vinyl monomer to the amount of the whole polymer to be produced, and Y is a percentage of the amount of a polymer produced at the time of finishing the addition of the sulfo group-containing vinyl monomer to the amount of the whole polymer to be produced, said polymerizing being selected from the group consisting of emulsion polymerizing and solution polymerizing, and spinning the resulting copolymer.

2. The process of claim 1, wherein the polymerization is carried out in an emulsion polymerization manner under the condition satisfying the following equation:

$$Y > 71$$

wherein Y is as defined above.

3. The process of claim 1, wherein the resulting copolymer is in the form of a spinning solution in acetone.

4. The process of claim 2, wherein the resulting copolymer is in the form of a spinning solution in acetone.

5. The process of claim 1, wherein the resulting copolymer is in the form of a spinning solution in acetonitrile.

6. The process of claim 2, wherein the resulting copolymer is in the form of a spinning solutin in acetonitrile.

7. The process of claim 1, wherein the spinning is carried out by wet spinning.

8. The process of claim 2, wherein the spinning is carried out by wet spinning.

9. The process of claim 7, wherein the spinning is carried out by employing a spinning solution of the copolymer dissolved in acetone.

10. The process of claim 8, wherein the spinning is carried out by employing a spinning solution of the copolymer dissolved in acetone.

11. The process of claim 7, wherein the spinning is carried out by employing a spinning solution of the copolymer dissolved in acetonitrile.

12. The process of claim 8, wherein the spinning is carried out by employing a spinning solution of the copolymer dissolved in acetonitrile.

* * * * *